Patented May 9, 1939

2,157,431

UNITED STATES PATENT OFFICE 2,157,431

MONOAZO DYES OF THE XANTHONE SERIES AND PROCESS OF MAKING THEM

Pierre Petitcolas, Rouen, France, assignor to Compagnie Nationale de Matières Colorantes et Manufactures de Produits Chimiques du Nord, Réunies, Etablissements Kuhlmann, Paris, France, a corporation of France No Drawing. Application July 28, 1937, Serial No. 156,177. In France August 4, 1936

4 Claims. (Cl. 260—152)

This invention relates to insoluble azodyestuffs and the process for the manufacture thereof.

The amino-xanthones and their derivatives have not hitherto been utilised for the production of azo-dyestuffs insoluble in water.

However, it has been discovered according to the present invention that dyestuffs of great commercial value are obtained by diazotisation of amino-xanthones and by coupling in substance or on the fibre the diazo derivatives thus obtained with coupling components of substantive character.

As coupling components of substantive character there can be used notably the arylides of ortho-hydroxy-carboxylic acids, the arylides of acyl-acetic acids and analogous compounds.

There were only known hitherto a very limited number of amino derivatives of xanthone, among others the 3-amino-xanthone of the formula:

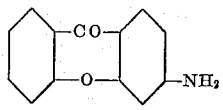

and the 2-amino-xanthone of the formula:

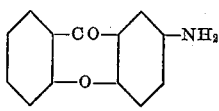

Ullmann and Wagner (Annalen 355, page 363) prepared 3-amino-xanthone by condensing with phenol the 4-nitro-2-chloro-benzoic acid, treating in the hot with sulphuric acid the nitrophenyl-salicylic acid (or 5-nitro-diphenyl-ether-2-carboxylic acid) obtained and reducing the 3-nitro-xanthone obtained with stannous chloride.

Purgotti prepared in the same way the 2-amino-xanthone by starting from 4-nitro-diphenyl-ether-2-carboxylic acid (Gazetta Chimica Italiana 441,644).

Now it has been found according to the present invention that it is possible to produce new azodyestuffs by starting not only from the known amino-xanthones but from new hitherto unknown amino-xanthones, the synthesis of which has been carried out by the applicants, or starting from derivatives of the amino-xanthones containing no groups capable of imparting solubility in water.

In order to obtain certain of these new amino-xanthones it is possible to proceed in a general manner in accordance with Ullmann and Wagner and Purgotti, but starting from other nitro-derivatives than those employed by these latter, notably from mono- or poly-halogenated derivatives, and if desired by replacing the phenol by a chloro-phenol, a cresol or other analogous compound.

It has also proved possible to prepare the 4-amino-xanthone of the formula:

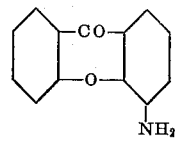

and its substitution products by condensing o-nitro-chlorobenzene for example or 1-nitro-2,5-dichlorobenzene with ortho-cresol or its substitution products. The nitro compounds of the diphenyl ether obtained are reduced and the bases are acetylated. After oxidation of the CH₃ group with potassium permanganate in dilute solution, ring formation to the xanthone is effected with concentrated sulphuric acid and then by dilution and heating the acetyl-amino group is saponified.

The derivatives of 4-amino-xanthone can likewise be prepared by condensing for example 2.5-dicholor-3-nitro-benzoic acid with phenol or its substitution products. The carboxylated nitro-chloro-diphenyl-ethers obtained are reduced, then the bases are converted by ring formation into xanthones by the action of sulphuric acid.

It is also possible to effect the synthesis of other derivatives of the amino xanthones by condensing with phenol or its substitution products nitro-polyhalogenated derivatives of benzoic acid, two of the atoms of halogen being in para-position, the other in ortho-position to the nitro group. The nitro diphenoxyl derivatives of benzoic acid thus obtained are reduced, then the bases are converted by ring formation into phenoxylated amino-xanthones under the action of the sulphuric acid.

A large number of dyestuffs obtained according to the present invention possess a remarkable collection of fastness properties.

The production of these dyestuffs on the fibre can be effected as regards the dyeing of cotton, viscose and other natural or artificial fibres by means of known processes, with or without intermediate formation of nitrosamines, diazo-amino compounds, diazo-sulphonates, Schiff bases and so on. The dyestuffs produced in substance can be employed for the dyeing of lacquers, varnishes, organic solvents, plastic masses, rubber and so on.

The following examples illustrate the invention:

Example 1

60 grams of caustic potash are dissolved in 200 grams of phenol. The mass is gradually heated to boiling to commencement of distillation of the phenol in order to eliminate the water formed in the reaction. After cooling to 130° C. there are introduced slowly 100 grams of 6-chloro-3-nitrobenzoic acid, the temperature being maintained below 160° C. After having maintained at this temperature for 1 hour the reaction product is poured into ice water and acidified with hydrochloric acid.

60 grams of this carboxyl derivative are heated on the water bath for 1 hour with 600 grams of sulphuric acid of 66° Bé. The fluorescent solution is poured on ice and the nitro-xanthone precipitates; it is filtered and washed with water. By reducing according to known processes with iron filings treated with acetic acid there is produced the 2-amino-xanthone;

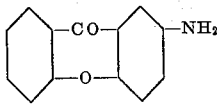

which, extracted from the sludge of iron with alcohol is produced after sublimation in the form of fine silk like lemon yellow needles (M. P. 206°).

2 grams of the β-naphthylamide of 2.3-hydroxy-naphthoic acid and pasted with 3 cc. of denatured alcohol and 0.8 cc. of caustic soda of 38° Bé. The whole is diluted with 2 cc. of cold water and there is obtained a clear solution to which is added 1 cc. of 33% formaldehyde. After 5 minutes standing this solution is poured into 1 litre of cold water to which has previously been added 5.2 cc. of caustic soda of 34° Bé. and 5 cc. of 50% sodium sulphoricinoleate. 50 grams of cotton yarn are handled for half an hour at 25-30° C. in this impregnating bath, then squeezed and immediately developed in a bath prepared in the following manner;

2.2 grams of 2-amino-xanthone are pasted with their own weight of warm water and 3.3 cc. of concentrated hydrochloric acid and then 40 cc. of water are added; the hydrochloride is insoluble; 0.7 gram of sodium nitrite dissolved in water is added; the whole is diazotised for 10 minutes at ordinary temperature and an almost colourless diazo solution is obtained which is neutralised with 3 grams of sodium acetate; this solution is diluted to 1 litre and 1 cc. of 50% acetic acid and 50 grams of common salt added.

The duration of the development in the bath thus prepared is half an hour in the cold; the skein of cotton is rinsed, acidified, rinsed, soaped for half an hour at the boiling point in a bath containing 5 grams of Marseilles soap per litre, rinsed again and dried. A brownish-red shade is obtained.

Example 2

By condensation of o-nitro-chlorobenzene with o-cresol there is obtained according to the known processes the 2-nitro-2'-methyl-1.1'-diphenyl-ether which by reduction followed by acetylation gives the 2-acetylamino-2'-methyl-1.1'-diphenyl-ether (M. P. 96°).

The acetyl derivative (1 part) is oxidised with potassium permanganate (1.5 parts) in aqueous solution (100 parts) at the boiling point. After complete decolorisation the manganese dioxide is filtered off. By acidification of the filtrate there is precipitated the 2-acetylamino-2'-carboxy-1.1'-diphenylether which, recrystallised from alcohol is produced in the form of fine colourless plates (M. P. 178°).

1 part of this carboxyl derivative is dissolved in 10 parts of sulphuric acid monohydrate. The sulphuric acid solution is heated to 80° C. for 2 hours and assumes a beautiful green fluorescence. The elimination of the acetyl group is easily effected by carefully adding 2 parts of water and heating for 12 hours to 80° C. The mass is poured on ice and, by neutralisation with an alkali, the 4-amino-xanthone precipitated which, recrystallised from alcohol is produced in the form of fine slightly greenish yellow coloured needles (M. P. 201–202°).

A skein of 50 grams of cotton yarn, impregnated in the customary manner in a bath constituted by a solution of 6 grams of the sodium salt of the anilide of β-hydroxy-naphthoic acid is developed in a developing bath in the following manner;

2.2 grams of 4-amino-xanthone are pasted with their weight of warm water and with 3.3 cc. of concentrated hydrochloric acid; the whole is diluted with 40 cc. of cold water; the hydrochloride is insoluble. 0.7 gram of sodium nitrite dissolved in water is added, the whole is diazotised for 10 minutes to a quarter of an hour at ordinary temperature and there is obtained an almost colourless diazo solution which is neutralised with 3 grams of sodium acetate and diluted to 1 litre; there are then added to this solution 1 cc. of 50% acetic acid and 50 grams of common salt.

The duration of the development is half an hour in the cold.

Working up is carried out in the customary manner and a red share is obtained.

Example 3

There are heated to boiling 1 part of 2-methyl-2' - acetylamino - 4' - chloro - 1.1' - diphenyl - ether (M. P. 82°), 3 parts of permanganate and 400 parts of water. After complete decolorisation the manganese dioxide is removed by filtration. The 2-carboxy-2'-acetylamino-4'-chloro-1.1-diphenyl-ether is precipitated from the filtrate by acidification. On recrystallisation from alcohol it is produced in the form of fine colourless plates, (M. P. 201° C.). The yield is about 50%.

1 part of this carboxyl derivative is dissolved in 15 parts of monohydrate. The whole is brought to 80° C. during 2 hours to effect ring formation. The fluorescent sulphuric acid solution is subject to the careful addition of 2 parts of water. The product is heated for 12 hours longer at 75–80° C. and poured on ice. By neutralisation with caustic soda there is isolated in a yield of about 80% the 2-chloro-4-amino-xanthone which, recrystallised from alcohol, forms fine greenish-yellow coloured needles (M. P. 233–234°).

Its general formula is:

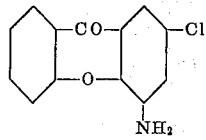

The percentage of nitrogen calculated is 5.7, the percentage found 5.6.

50 grams of cotton yarn impregnated in a solution of 4 grams of the sodium salt of the para-anisidide of β-hydroxy-naphthoic acid (prepared in the customary manner) are treated with a bath prepared in the following manner:

2.5 grams of 2-chloro-4-amino-xanthone are pasted with their own weight of warm water and with 3.3 cc. of concentrated hydrochloric acid. This paste is diluted with 40 cc. of cold water; the hydrochloride is insoluble. 0.7 gram of sodium nitrite dissolved in water is added; diazotisation is carried out for 10 minutes to a quarter of an hour at ordinary temperature and there is obtained a yellow solution which is neutralised with 3 grams of sodium acetate and which is diluted with 1 litre of water. There are then added 1 cc. of 50% acetic acid and 50 grams of common salt.

Development and working up are carried out in the customary manner and a red shade is obtained.

Example 4

200 grams of phenol are subjected to the addition of 65 grams of pure caustic potash. The water formed in the reaction is distilled off by gradually heating the mass to 190–195° C. After cooling to 130° C. there are added in small portions 65 grams of 5-nitro-2.4-dichloro-benzoic acid. The reaction which is very exothermic heats the mass to 180° C. The precipitation of large quantities of potassium chloride is observed. The temperature of 130° C. is maintained for about 10 minutes, then the whole is poured into about 4 litres of ice water in order to dissolve the excess phenol. The perfectly clear solution is neutralised with hydrochloric acid to a reaction acid to Congo red. The 5-nitro-2.4 diphenoxy-benzoic acid which has precipitated is filtered with suction then recrystallised from alcohol. It then appears in the form of fine almost colourless plates (M. P. 184°).

There are heated to boiling for half an hour 60 grams of iron, 30 cc. of glacial acetic acid and 400 cc. of water. There is introduced gradually the above condensation product and the whole is maintained for 10 hours at boiling point with addition of water to compensate evaporation. After neutralisation with dilute sodium carbonate the whole is filtered and the product washed with water. The filtrate is acidified with acetic acid. The 1-amino-2.4-diphenoxy-5-carboxy-benzene precipitates initially in a pasty form, then it slowly crystallises. Dry weight 49 grams. After recrystallisation from acetic acid the base is produced in the form of brilliant colourless plates (M. P. 123° C.).

180 cc. of sulphuric acid of 68° Bé. are subjected to the addition of 40 cc. of water. There are introduced slowly in about a quarter of an hour about 30 grams of 5-amino-2.4-diphenoxy-benzoic acid into the acid thus diluted and the temperature of which has been raised to about 80° C. After the introduction the whole is allowed to stand with stirring for 15 minutes longer and the perfectly clear fluorescent solution is poured on 600 grams of ice. The almost insoluble sulphate of the amino-xanthone precipitates first in the form of a pasty mass which crystallises rapidly. When taken up in dilute soda it gives the phenoxylated amino-xanthone which separates in the form of fine greenish yellow crystals. They are filtered and washed with water. After recrystallisation from alcohol the new base is produced in the form of fine brilliant yellow flakes (M. P. 210° C.). Its general formula is:

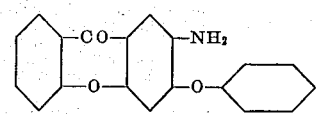

Analysis gives C% calculated: 75.25 Found: 74.8
H% calculated: 4.3 Found: 4.8

This base diazotised under customary conditions gives easily a complex of diazonium chloride and zinc almost insoluble in a saline medium but very soluble in pure water. It dries easily and can be mixed with aluminium sulphate or dehydrated alum.

A skein of cotton yarn, impregnated in the customary manner in a solution of the sodium salt of the para-chloro-o-anisidide of β-hydroxy-naphthoic acid is developed in a bath constituted by a solution of the diazonium salt thus stabilised.

There is obtained a bright red shade.

Example 5

100 grams of phenol are subjected to the addition of 30 grams of pure potash. The water formed is distilled off by gradually bringing the mass to 190–195° C. After cooling to 130° C. there are added gradually 50 grams of 2.5-dichloro-3-nitro-benzoic acid. The mass is brought to about 180° C. during 10–15 minutes. The whole is poured into ice water and acidified with hydrochloric acid. The oily precipitate which is deposited is taken up in dilute alcohol in order to remove the excess phenol which it still contains. There are isolated in this manner very beautiful colourless plates (M. P. 154°) constituted by the 2-nitro-4-chloro-6-carboxy-1.1′- diphenyl - ether of the general formula:

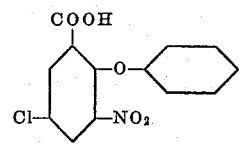

The product is reduced by known processes. The 2-amino-4-chloro-6-carboxy-1.1′-diphenyl-ether treated at 100° C. with 85% sulphuric acid is converted by ring formation into the 4-amino-2-chloro-xanthone (M. P. 233–234° C.), identical with that prepared in Example 3.

It is possible to replace in this synthesis the phenol by chloro-phenols, cresols, mono-alky-derivatives of hydro quinone or resorcinol or other analogous compounds.

The following table indicates the shades obtained with different amino-xanthones on the one hand and different coupling components on the other hand:

| Diazotisation component | Coupling component | Shade on cotton |
|---|---|---|
| 2-amino-xanthone | Anilide of 2.3-hydroxynaphthoic acid | Scarlet. |
| | m-Nitranilide of 2.3-hydroxynaphthoic acid | Orange. |
| | β-Naphthylamide of 2.3-hydroxynaphthoic acid | Brownish red. |
| | 5-chloro-2-toluidide of 2.3-hydroxynaphthoic acid | Scarlet. |
| | p-Anisidide of 2.3-hydroxynaphthoic acid | Yellowish red. |
| | o-Toluidide of 2.3-hydroxynaphthoic acid | Do. |
| | α-Naphthylamide of 2.3-hydroxynaphthoic acid | Do. |
| | o-Anisidide of 2.3-hydroxynaphthoic acid | Do. |
| | p-Chloro-o-anisidide of 2.3-hydroxynaphthoic acid | Do. |
| | 2.3-hydroxynaphthoyl-2.4 dimethoxy-5-chloro-1-aminobenzene. | Dull red. |
| | Diacetoacetyl-o-tolidine | Yellow. |
| 4-amino-xanthone | Anilide of 2.3-hydroxynaphthoic acid | Red. |
| | m-Nitranilide of 2.3-hydroxynaphthoic acid | Yellowish red. |
| | β-Naphthylamide of 2.3-hydroxynaphthoic acid | Do. |
| | 5-chloro-2-toluidide of 2.3-hydroxynaphthoic acid | Scarlet. |
| | Para-anisidide of 2.3-hydroxynaphthoic acid | Red. |
| | o-Toluidide of 2.3-hydroxynaphthoic acid | Scarlet. |
| | α-Naphthylamide of 2.3-hydroxynaphthoic acid | Yellowish red. |
| | o-Anisidide of 2.3-hydroxynaphthoic acid | Scarlet. |
| | p-Chloro-o-anisidide of 2.3-hydroxynaphthoic acid | Do. |
| | 2.3-hydroxynaphthoyl-2.4-dimethoxy-5-chloro-1-aminobenzene. | Reddish brown. |
| | Diacetoacetyl-o-tolidine | Yellow. |
| 2-chloro-4-amino-xanthone | Anilide of 2.3-hydroxynaphthoic acid | Red. |
| | m-Nitranilide of 2.3-hydroxynaphthoic acid | Do. |
| | β-Naphthylamide of 2.3-hydroxynaphthoic acid | Do. |
| | 5-chloro-2-toluidide of 2.3-hydroxynaphthoic acid | Yellowish red. |
| | p-Anisidide of 2.3-hydroxynaphthoic acid | Red. |
| | o-Toluidide of 2.3-hydroxynaphthoic acid | Yellowish red. |
| | α-Naphthylamide of 2.3-hydroxynaphthoic acid | Bluish red. |
| | o-Anisidide of 2.3-hydroxynaphthoic acid | Yellowish red. |
| | p-Chloro-o-anisidide of 2.3-hydroxynaphthoic acid | Do. |
| | 2.3-hydroxynaphthoyl-2.4-dimethoxy-5-chloro-1-aminobenzene. | Bluish red. |
| | Diacetoacetyl-o-tolidine | Yellow. |
| 3-phenoxy-2-amino-xanthone | Anilide of 2.3-hydroxynaphthoic acid | Scarlet. |
| | m-Nitranilide of 2.3-hydroxynaphthoic acid | Bluish red. |
| | β-Naphthylamide of 2.3-hydroxynaphthoic acid | Scarlet. |
| | 5-chloro-2-toluidide of 2.3-hydroxynaphthoic acid | Pure red. |
| | p-Anisidide of 2.3-hydroxynaphthoic acid | Scarlet. |
| | o-Toluidide of 2.3-hydroxynaphthoic acid | Yellowish red. |
| | α-Naphthylamide of 2.3-hydroxynaphthoic acid | Pure red. |
| | o-Anisidide of 2.3-hydroxynaphthoic acid | Bright red. |
| | p-Chloro-o-anisidide of 2.3-hydroxynaphthoic acid | Do. |
| | 2.3-hydroxynaphthoyl-2.4-dimethoxy-5-chloro-1-aminobenzene. | Red. |
| | Diacetoacetyl-o-tolidine | Yellow. |

What I claim is:

1. Process for the manufacture of insoluble azodyestuffs consisting in coupling a diazo derivative of amino-xanthone with a member of the group consisting of the phenyl and naphthylamides of the 2.3 hydroxy-naphthoic acid and the diaceto-acetyl-o-tolidine.

2. Process for the manufacture of insoluble azodyestuffs consisting in coupling a diazo derivative of amino-xanthone substituted by at least one member of the group consisting of halogen atoms, alkyl, alkoxy, and phenoxy groups, with a member of the group consisting of the phenyl and naphthylamides of the 2.3 hydroxynaphthoic acid and the diaceto-acetyl-o-tolidine.

3. Insoluble azodyestuffs obtained by the process according to claim 1.

4. Insoluble azodyestuffs obtained by the process according to claim 2.

PIERRE PETITCOLAS.